E. F. BERRY.
Broadcast Planter.
No. 14,274.
Patented Feb. 19, 1856.
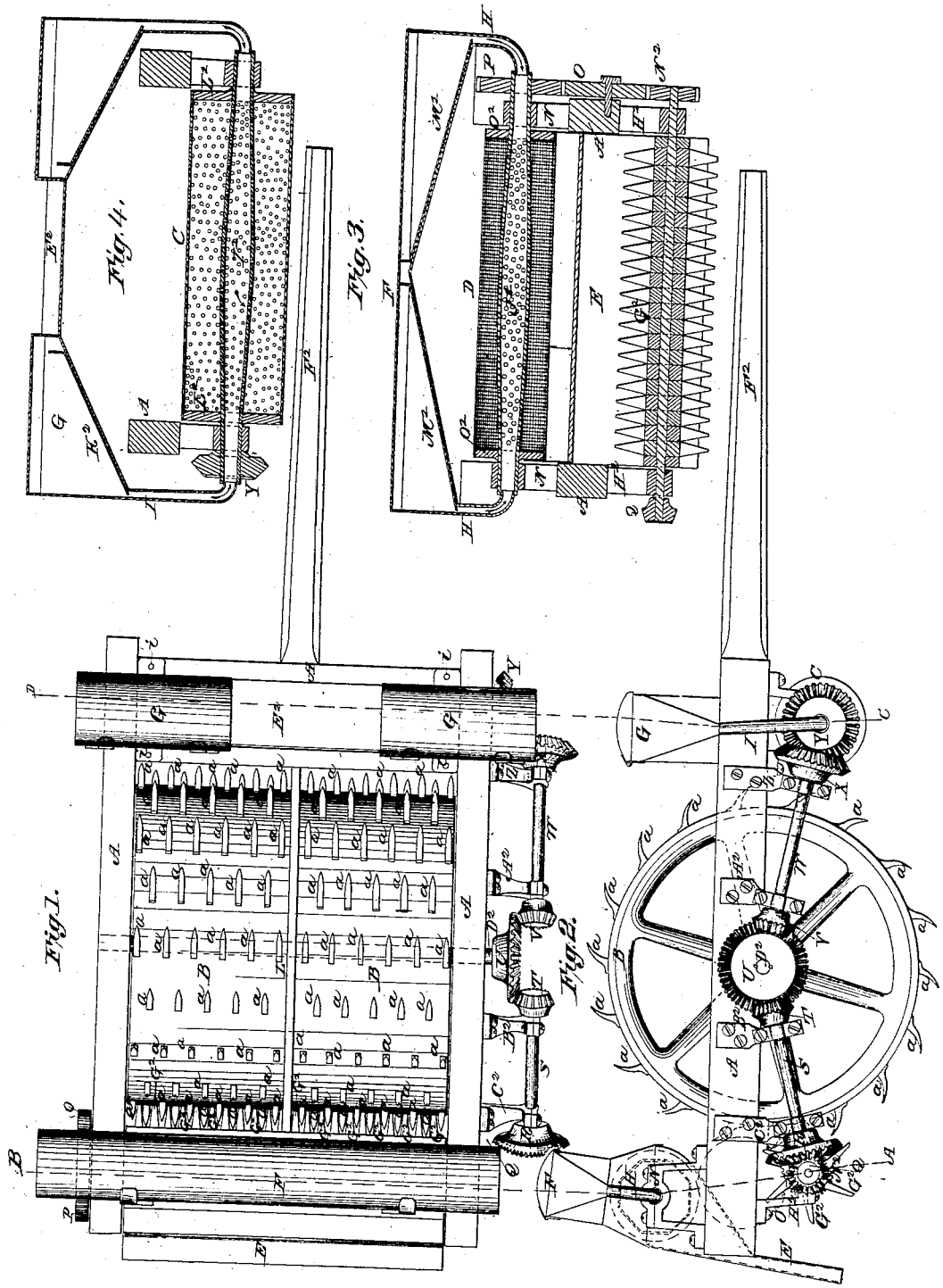
N. PETERS, PHOTO-LITHOGRAPHER, WASHINGTON, D. C.

UNITED STATES PATENT OFFICE.

EDWARD F. BERRY, OF HUDSON, NEW HAMPSHIRE.

IMPROVEMENT IN MACHINES FOR SOWING SEED BROADCAST.

Specification forming part of Letters Patent No. 14,274, dated February 19, 1856.

*To all whom it may concern:*

Be it known that I, EDWARD F. BERRY, of Hudson, in the county of Hillsborough and State of New Hampshire, have invented a new and useful Improvement in Self-Acting Cultivators; and I hereby declare that the following specification, in connection with the accompanying drawings and references thereon, constitutes a lucid, clear, and exact description of the construction and operation of the same.

In referring to the drawings, Figure 1 denotes a plan or top view; Fig. 2, a side elevation of the same; Fig. 3, a transverse and vertical section on lines A B, Figs. 1 and 2. Fig. 4 denotes a transverse and vertical section on lines C D, Figs. 1 and 2.

*Invention.*—The nature of my invention consists of my improved cultivator, so constructed as to penetrate and loosen the soil sufficient to receive the seed and to sow the seed broadcast thereon, and afterward properly cover the seed, all by once passing over the ground, as will be hereinafter seen.

*Construction.*—To enable persons skilled in in the art to which my invention appertains to construct and carry out the same, I will describe it as follows:

I construct a frame of wood, (seen at A A in the drawings.) To the under side of this frame I suspend the cylinder-shaft $D^2$ in proper metal boxes, which are secured to the under side of the frame A A. To this shaft I secure the cylinder B, which is nearest the bevel-gear U, and the other cylinder B turns freely on the shaft $D^2$, in order that the cultivator can turn the corners freely around the land when in operation. These cylinders are provided with a number of teeth, as seen at *a a*, &c., for entering, tearing, and working the soil by the revolving of the cylinders B B and their forward movement, which rolls the ground and covers the seed after it has been pulverized and sown.

On the out end of the shaft $D^2$, I fix a bevel-gear, (seen at U,) into which fits the bevel-gear T, which is fixed to the shaft S, so as to to turn in the stands $C^2$ and $B^2$. On the end of this shaft is placed the bevel-gear R, which gears into and operates or revolves the gear Q and revolving fork $G^2$ for cleaning and removing the dirt or rubbish from between the teeth *a a*, &c., of the cylinders B B as the machine is being used. This fork-shaft is suspended in the stands $H^2$ $H^2$, which are fastened to the under side of the frame A A.

I fasten a gear (seen at $N^2$) to the opposite end of the fork-shaft from the gear Q. This gear $N^2$ gears into and drives the intermediate gear, O, which gears into and drives the gear P, which is fixed to the perforated tube $J^2$, and is revolved by the gears just mentioned from the driving-gear U, so as this tube will distribute the seed evenly the whole length of the lower portion of the perforated sowing-cylinder D, in order that the grain or seed may be sown evenly broadcast over the soil. The tube $J^2$ is made largest in the middle, so that the seed will slide along from the tubes H H, so that it will be sown or distributed even to the octagonal sowing-drum D, and by this in turn to the soil.

The octagonal drum, which is suspended in the stands N, may be made of wire-gauze or any equivalent material fixed to the heads $O^2$ $O^2$, with the size, shape, and number of meshes to suit the purpose desired. The octagon shape is given it to shake the grass-seed through the meshes as it turns. This drum is placed at the rear end of my cultivator, and is intended to sow grass-seed after the grain has been sown by the forward cylinder, C, which is constructed of perforated metal plate or other desired substance, with size, shape, and number of meshes and holes as desired. This perforated metal is fixed to the metal heads $L^2$ $L^2$.

The central tube or shaft, $I^2$, is enlarged at its center for the more equal distribution of the seed to the outside cylinder as it enters the tube $I^2$ through the tubes I I, which lead from the hoppers G G to each end of this tube, through which the grain passes for sowing.

The cylinder C is rotated as the horses which are hitched to the cultivator, guided by the pole $F^2$ by means of the bevel-gear V, which gears into and is driven by the driving-gear U, the gear V being firmly fixed to the shaft W, which revolves in the stands $A^2$ and Z, this shaft having on its end the bevel-gear X, which gears into and drives the bevel-gear Y, which is attached to the tube $I^2$ to revolve it with the outside cylinder, C, to which it is connected by the heads $L^2$ $L^2$.

Between the hoppers G G, I construct a seat for the driver. (Seen at $E^2$.) At $K^2$ $K^2$ can be seen a regulating-slide, which may be moved to let more or less seed into the sowing-cylinder C. The same arrangement of slides (seen at $M^2 M^2$) in the hopper F are for the same purpose—that is, of letting in more or less grain or seed to the octagonal drum D.

Portions of the tube E incase the sowing octagon drum D. The tube reaches down nearly to the ground to prevent the grass-seed from being blown or wafted away by the wind.

*Use.*—All that is necessary to use my machine or cultivator is to put sufficient grain into the forward hoppers and grass-seed into the rear one and attach the team to the cultivators and drive over the ground which it is desired to cultivate, the teeth *a a*, &c., entering the soil their full length, and by their peculiar shape and forward movement and revolving of the cylinders B B the earth is separated, turned over, and pulverized, and carrying the seed just previously sown on the ground under the soil, and the surfaces of the cylinders B B roll over and press down and smooth the ground as desired.

I claim—

The perforated sowing-cylinder C and the secondary internal perforated distributing-cylinder, $I^2$, connected with the hopper at its center by the tubes I I, with its central portion or tube enlarged so as to distribute the seed evenly to the whole length of the lower portion of the sowing-cylinder, in order that the seed may be cast or sown evenly broadcast over the soil, essentially in the manner and for the purposes fully set forth.

EDWARD F. BERRY.

Witnesses:
   E. W. SCOTT,
   THOS. F. DEWHURST.